(12) United States Patent
Jordan et al.

(10) Patent No.: US 7,613,190 B2
(45) Date of Patent: *Nov. 3, 2009

(54) SYSTEM AND METHOD FOR STREAMING SEQUENTIAL DATA THROUGH AN AUTOMOTIVE SWITCH FABRIC

(75) Inventors: Patrick D. Jordan, Austin, TX (US); Hai Dong, Austin, TX (US); Hugh W. Johnson, Cedar Park, TX (US); Prakash U. Kartha, Round Rock, TX (US); Samuel M. Levenson, Arlington Heights, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 762 days.

This patent is subject to a terminal disclaimer.

(21) Appl. No.: 11/015,153

(22) Filed: Dec. 17, 2004

(65) Prior Publication Data

US 2006/0083229 A1     Apr. 20, 2006

Related U.S. Application Data

(60) Provisional application No. 60/619,669, filed on Oct. 18, 2004.

(51) Int. Cl.
*H04L 12/28* (2006.01)
*H04L 12/56* (2006.01)

(52) U.S. Cl. .................................................. 370/394

(58) Field of Classification Search ................ 370/389, 370/242, 217, 216, 241, 503, 328, 225, 230, 370/234, 394, 401, 352, 392, 254, 258, 351, 370/400, 410, 395, 386, 463; 709/220–222, 709/249, 208, 238, 209; 379/114, 90, 93, 379/88, 900; 710/309; 701/1, 36, 210, 115; 340/425, 531; 455/73, 41, 512, 452

See application file for complete search history.

(56) References Cited

U.S. PATENT DOCUMENTS 4,816,989 A     3/1989   Finn et al.

(Continued)

OTHER PUBLICATIONS

D. John Oliver, Implementing the J1850 Protocol, 15 pages.

(Continued)

*Primary Examiner*—Hong Cho
*Assistant Examiner*—Prenell P Jones

(57) ABSTRACT

A system and method for streaming sequential data through a vehicle switch fabric network. This is particular useful in areas such as reprogramming nodes in the automotive switch fabric network where relatively large records or messages need to be transmitted through the switch fabric, although the invention may be used in other areas. In sum, the system and method described herein takes large data records and breaks them down into smaller units (data packets) that fit within the constraints of the physical layer on which communication links in the switch fabric network is built. The smaller data packets are assigned with a message identification and a sequence number. Data packets associated with the same data record or message are assigned with the same message identification but may differ in their sequence number. Each data packet is transmitted over the vehicle switch fabric network to a destination node. At the destination node, the data packets may be reassembled to its original data format based on the message identification and sequence numbers. The reassembled message may then be presented to an application in the node for processing.

10 Claims, 9 Drawing Sheets

U.S. PATENT DOCUMENTS

| | | | |
|---|---|---|---|
| 5,151,899 A * | 9/1992 | Thomas et al. ............... 370/394 |
| 5,195,091 A | 3/1993 | Farwell et al. |
| 5,321,689 A | 6/1994 | Suzuki et al. |
| 5,566,180 A | 10/1996 | Eidson et al. |
| 5,612,953 A | 3/1997 | Olnowich |
| 5,802,052 A | 9/1998 | Venkataraman |
| 6,356,823 B1 | 3/2002 | Iannotti et al. |
| 6,373,834 B1 | 4/2002 | Lundh et al. |
| 6,420,797 B1 | 7/2002 | Steele et al. |
| 6,430,164 B1 | 8/2002 | Jones et al. |
| 6,477,453 B2 | 11/2002 | Oi et al. |
| 6,559,783 B1 | 5/2003 | Stoneking |
| 6,611,519 B1 | 8/2003 | Howe |
| 6,611,537 B1 | 8/2003 | Edens et al. |
| 6,643,465 B1 * | 11/2003 | Bosinger et al. ............... 398/59 |
| 6,732,031 B1 | 5/2004 | Lightner et al. |
| 6,747,365 B2 | 6/2004 | Reinold et al. |
| 6,757,521 B1 | 6/2004 | Ying |
| 6,845,416 B1 * | 1/2005 | Chasmawala et al. ....... 710/107 |
| 7,027,773 B1 | 4/2006 | McMillin |
| 7,210,063 B2 | 4/2007 | Holcroft et al. |
| 7,272,496 B2 * | 9/2007 | Remboski et al. ........... 701/210 |
| 2002/0077739 A1 | 6/2002 | Augsburger et al. |
| 2002/0080829 A1 | 6/2002 | Ofek et al. |
| 2002/0087891 A1 | 7/2002 | Little et al. |
| 2003/0043739 A1 | 3/2003 | Reinold et al. |
| 2003/0043750 A1 | 3/2003 | Remboski et al. |
| 2003/0043779 A1 * | 3/2003 | Remboski et al. ........... 370/351 |
| 2003/0043793 A1 * | 3/2003 | Reinold et al. ............... 370/386 |
| 2003/0043799 A1 | 3/2003 | Reinold et al. |
| 2003/0043824 A1 | 3/2003 | Remboski et al. |
| 2003/0045234 A1 * | 3/2003 | Remboski et al. ............. 455/41 |
| 2003/0045971 A1 | 3/2003 | Reinold et al. |
| 2003/0045972 A1 * | 3/2003 | Remboski et al. ............... 701/1 |
| 2003/0046327 A1 | 3/2003 | Reinold et al. |
| 2003/0051131 A1 | 3/2003 | Reinold et al. |
| 2003/0065630 A1 | 4/2003 | Brown et al. |
| 2003/0091035 A1 | 5/2003 | Roy et al. |
| 2003/0185201 A1 | 10/2003 | Dorgan |
| 2003/0188303 A1 | 10/2003 | Barman et al. |
| 2004/0001593 A1 | 1/2004 | Reinold et al. |
| 2004/0002799 A1 | 1/2004 | Dabbish et al. |
| 2004/0003227 A1 | 1/2004 | Reinhold et al. |
| 2004/0003228 A1 | 1/2004 | Fehr et al. |
| 2004/0003229 A1 | 1/2004 | Reinold et al. |
| 2004/0003230 A1 | 1/2004 | Puhl et al. |
| 2004/0003231 A1 | 1/2004 | Levenson et al. |
| 2004/0003232 A1 | 1/2004 | Levenson et al. |
| 2004/0003233 A1 | 1/2004 | Reinold et al. |
| 2004/0003234 A1 | 1/2004 | Reinold et al. |
| 2004/0003237 A1 | 1/2004 | Puhl et al. |
| 2004/0003242 A1 | 1/2004 | Fehr et al. |
| 2004/0003243 A1 | 1/2004 | Fehr et al. |
| 2004/0003245 A1 | 1/2004 | Dabbish et al. |
| 2004/0003249 A1 | 1/2004 | Dabbish et al. |
| 2004/0003252 A1 | 1/2004 | Dabbish et al. |
| 2004/0042469 A1 * | 3/2004 | Clark et al. ................. 370/401 |
| 2004/0043739 A1 | 3/2004 | Jordanger et al. |
| 2004/0043750 A1 | 3/2004 | Kim |
| 2004/0043824 A1 | 3/2004 | Uzelac |
| 2004/0045234 A1 | 3/2004 | Morgan et al. |
| 2004/0045971 A1 | 3/2004 | Lothe |
| 2004/0131014 A1 | 7/2004 | Thompson et al. |
| 2004/0148460 A1 | 7/2004 | Steinmetz et al. |
| 2004/0213295 A1 | 10/2004 | Fehr |
| 2004/0227402 A1 | 11/2004 | Fehr et al. |
| 2004/0254700 A1 | 12/2004 | Fehr et al. |
| 2004/0258001 A1 | 12/2004 | Remboski et al. |
| 2005/0004727 A1 | 1/2005 | Remboski et al. |
| 2005/0038583 A1 | 2/2005 | Fehr et al. |
| 2005/0160285 A1 | 7/2005 | Evans |
| 2005/0251604 A1 | 11/2005 | Gerig |
| 2005/0251608 A1 * | 11/2005 | Fehr et al. ................... 710/309 |
| 2006/0013263 A1 | 1/2006 | Fellman |
| 2006/0013565 A1 | 1/2006 | Baumgartner |
| 2006/0020717 A1 | 1/2006 | Remboski et al. |
| 2006/0083172 A1 * | 4/2006 | Jordan et al. ................. 370/241 |
| 2006/0083173 A1 * | 4/2006 | Jordan et al. ................. 370/242 |
| 2006/0083250 A1 * | 4/2006 | Jordan et al. ................. 370/400 |
| 2006/0083264 A1 | 4/2006 | Jordan et al. |
| 2006/0083265 A1 | 4/2006 | Jordan et al. |
| 2006/0282549 A1 | 12/2006 | Vinnemann |

OTHER PUBLICATIONS

Controller Area Network (CAN) —Protocol, CAN in Automation (CIA), 5 pages, 2003.

D. John Oliver, Intel Corporation, "Implementing the J1850 Protocol", 15 pages, available from the Internet at http://developer.intel.com/design/intarch/papers/j1850_wp.pdf (per Internet Archive Wayback Machine) Sep. 2000.

"Controller Area Network (CAN)—Protocol", copyright 2003 by CAN in Automation (CiA), 5 pages, available from the Internet at http://www.can-cia.org/can/protocol/ (per Internet Archive Wayback Machine) May 2004.

* cited by examiner

SYSTEM AND METHOD FOR STREAMING SEQUENTIAL DATA THROUGH AN AUTOMOTIVE SWITCH FABRIC

The present application claims priority from provisional application, Ser. No. 60/619,669, entitled "System and Method for Streaming Sequential Data Through an Automotive Switch Fabric Network," filed Oct. 18, 2004, which is commonly owned and incorporated herein by reference in its entirety.

FIELD OF THE INVENTION

This invention in general relates to in-vehicle communication networks and particularly to a system and method for streaming sequential data through an automotive switch fabric network.

BACKGROUND OF THE INVENTION

The commonly assigned United States patent application entitled "Vehicle Active Network," Ser. No. 09/945,581, filed Aug. 31, 2001, Publication No. US 20030043793, the disclosure of which is hereby expressly incorporated herein by reference, introduces the concept of an active network that includes a switch fabric. The switch fabric is a web of interconnected switching devices or nodes. The switching device or nodes are joined by communication links for the transmission of data packets between the switching devices or nodes. Control devices, sensors, actuators and the like are coupled to the switch fabric, and the switch fabric facilitates communication between these coupled devices.

The coupled devices may be indicator lights, vehicle control systems, vehicle safety systems, and comfort and convenience systems. A command to actuate a device or devices may be generated by a control element coupled to the switch fabric and is communicated to the device or devices via the switch fabric nodes.

In the context of vehicular switch fabric networks, a challenge is presented in terms of how relatively large data records and messages are transported across the switch fabric network. In particular, when sending large data records and messages across the switch fabric network, the size of the data packets may be constrained by the physical layer on which the communication links that join the switching devices or nodes are built. A need exists for the ability to transmit large records and messages across the switch fabric when size restrictions for the communication links exist.

It is, therefore, desirable to provide a system and method to overcome or minimize most, if not all, of the preceding problems especially in the area of transmitting large data records and messages across the nodes in an automotive switch fabric network. This would help in several areas including the reprogramming of switch fabric nodes where large records need to be downloaded.

Figure 1:
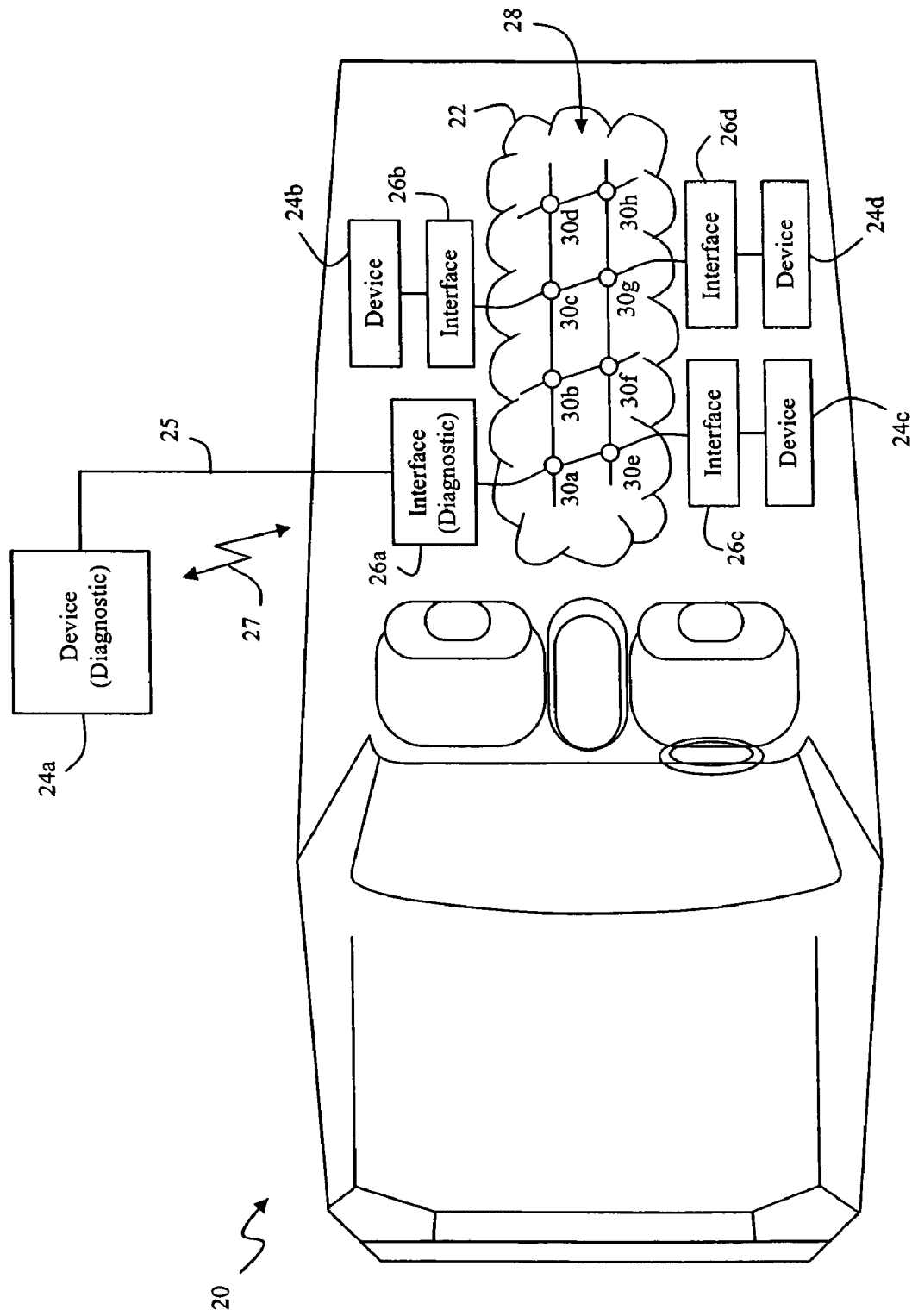
FIG. 1 is a block diagram illustrating an embodiment of a vehicle switch fabric network.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for streaming sequential data through a vehicle switch fabric network. This is particular useful in areas such as reprogramming nodes in the automotive switch fabric network where relatively large records or messages need to be transmitted through the switch fabric, although the invention may be used in other areas. In sum, the system and method described herein takes large data records and breaks them down into smaller units (data packets) that fit within the constraints of the physical layer on which communication links in the switch fabric network is built. The smaller data packets are assigned with a message identification and a sequence number. Data packets associated with the same data record or message are assigned with the same message identification but may differ in their sequence number. Each data packet is transmitted over the vehicle switch fabric network to a destination node. At the destination node, the data packets may be reassembled to its original data format based on the message identification and sequence numbers. The reassembled message may then be presented to an application in the node for processing.

Now, turning to the drawings, FIG. 1 illustrates a vehicle 20 including a network 22 to which various vehicle devices 24a-d are coupled via respective interfaces 26a-d. The vehicle devices 24a-d may be sensors, actuators, and processors used in connection with various vehicle functional systems and sub-systems, such as, but not limited to, diagnostic, control-by-wire applications for throttle, braking and steering control, adaptive suspension, power accessory control, communications, entertainment, and the like. The devices 24a-d may be external or internal to the vehicle. The embodiment in FIG. 1 includes an external device 24a and several internal devices 24b-d.

The interfaces 26a-d are any suitable interface for coupling the particular vehicle device 24a-d to the network 22, and may be wire, optical, wireless or combinations thereof. The vehicle device 24a-d is particularly adapted to provide one or more functions associated with the vehicle 20. These vehicle devices 24a-d may be data producing, such as a sensor, data consuming, such as an actuator, or processing, which both produces and consumes data. In one embodiment, the external device 24a is a diagnostic device that permits a user to exchange data with the network of the vehicle, as will be explained further below. Data produced by or provided to a vehicle device 24a-d, and carried by the network 22, is independent of the function of the vehicle device 24a-d itself. That is, the interfaces 26a-d provides independent data exchange between the coupled device 24a-d and the network 22.

The connection between the devices 24a-d and the interfaces 26a-d may be a wired or wireless connection. FIG. 1 illustrates both types of connections between the diagnostic device 24a and its interface 26a, a wired connection 25 and a wireless connection 27. In the wireless connection, the device 24a and the interface 26a include wireless communication transceivers permitting the units to communicate with each other via an optical or radio frequency transmission. Additionally, the interface 26a may be a single device or incorporated as a single assembly as part of a gateway node 30a. Irregardless of the type of connection or type of assembly, the interface 26a to the diagnostic device 24a should arbitrate the linking of the device 24a to the network 22 through an authentication, security and encryption process.

The network 22 may include a switch fabric 28 defining a plurality of communication paths between the vehicle devices 24a-d. The communication paths permit multiple simultaneous peer-to-peer, one-to-many, many-to-many, etc. communications between the vehicle devices 24a-d. During operation of the vehicle 20, data exchanged, for example, between devices 24a and 24d may utilize any available path or paths between the vehicle devices 24a, 24d. In operation, a single path through the switch fabric 28 may carry all of a single data communication between one vehicle device 24a and another vehicle device 24d, or several communication paths may carry portions of the data communication. Subsequent communications may use the same path or other paths as dictated by the then state of the network 22. This provides reliability and speed advantages over bus architectures that provide single communication paths between devices, and hence are subject to failure with failure of the single path. Moreover, communications between other of the devices 24b, 24c may occur simultaneously using the communication paths within the switch fabric 28.

The network 22 may comply with transmission control protocol/Internet (TCP/IP), asynchronous transfer mode (ATM), Infiniband, RapidIO, or other packet data protocols. As such, the network 22 utilizes data packets, having fixed or variable length, defined by the applicable protocol. For example, if the network 22 uses asynchronous transfer mode (ATM) communication protocol, ATM standard data cells are used.

The internal vehicle devices 24b-d need not be discrete devices. Instead, the devices may be systems or subsystems of the vehicle and may include one or more legacy communication media, i.e., legacy bus architectures such as the Controller Area Network (CAN) Protocol, the SAE J1850 Communication Standard, the Local Interconnect Network (LIN) Protocol, the FLEXRAY Communications System Standard, the Media Oriented Systems Transport or MOST Protocol, or similar bus structures. In such embodiments, the respective interface 26b-d may be configured as a proxy or gateway to permit communication between the network 22 and the legacy device.

Figure 2:
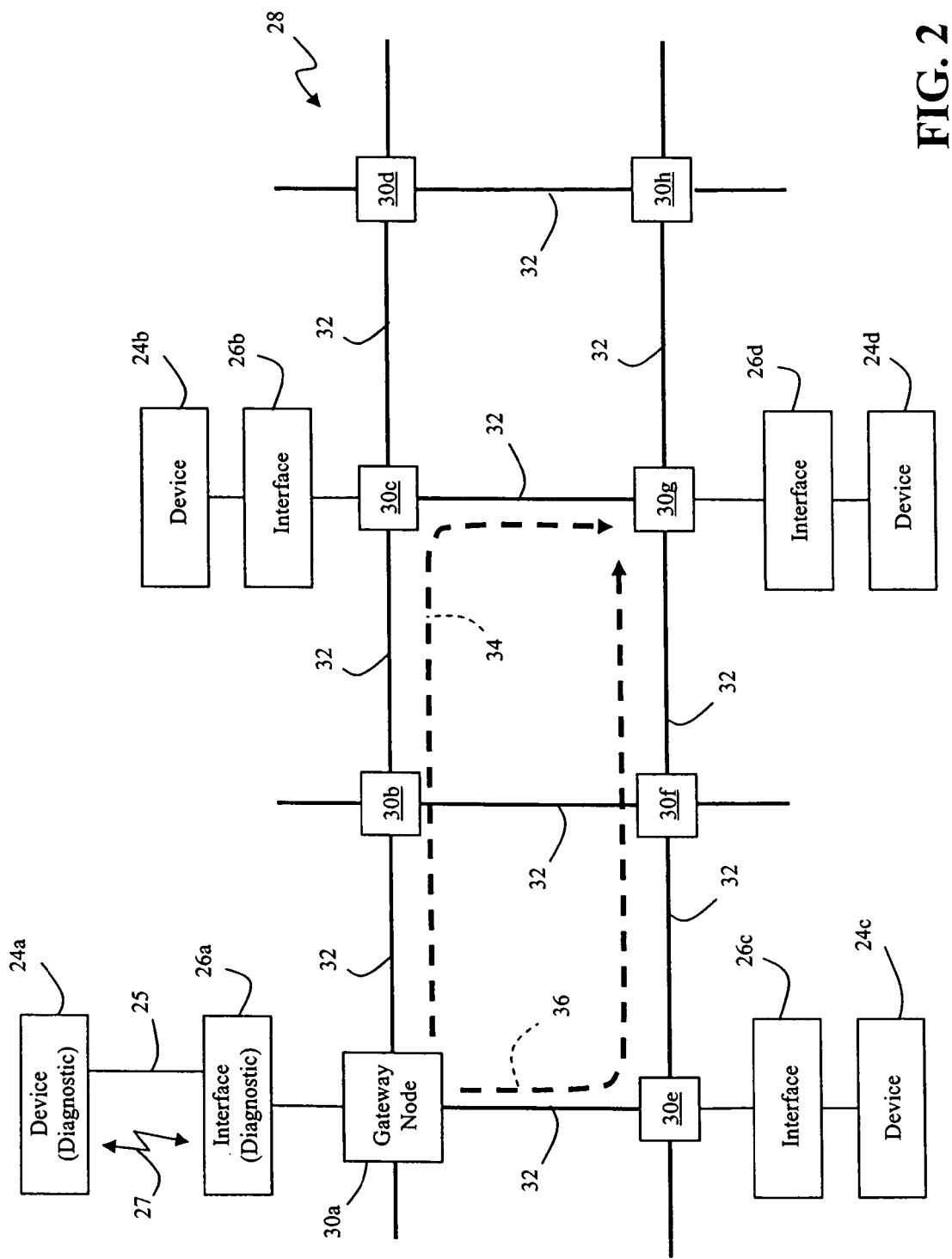
FIG. 2 is a diagram illustrating a portion of the switch fabric network connected to a plurality of interfaces and devices.

Referring to FIG. 2, an active network 22 in accordance with one embodiment of the present invention includes a switch fabric 28 of nodes 30a-h that communicatively couples a plurality of devices 24a-d via respective interfaces 26a-d. Connection links or media 32 interconnects the nodes 30a-h. The connection media 32 may be bounded media, such as wire or optical fiber, unbounded media, such as free optical or radio frequency, or combinations thereof. In addition, the term node is used broadly in connection with the definition of the switch fabric 28 to include any number of intelligent structures for communicating data packets within the network 22 without an arbiter or other network controller and may include: switches, intelligent switches, routers, bridges, gateways and the like. For instance, in the embodiment shown in FIG. 2, the node 30a may be a gateway node that connects the diagnostic interface 26a (and the diagnostic device 24a) to the switch fabric 28. Data is carried through the network 22 in data packet form guided by the nodes 30a-h.

The cooperation of the nodes 30a-h and the connection media 32 define a plurality of communication paths between the devices 24a-d that are communicatively coupled to the network 22. For example, a route 34 defines a communication path from the gateway node 30a to a target node 30g. If there is a disruption along the route 34 inhibiting communication of the data packets from the gateway node 30a to the target node 30g, for example, if one or more nodes are at capacity or have become disabled or there is a disruption in the connection media joining the nodes along route 34, a new route, illustrated as route 36, can be used. The route 36 may be dynamically generated or previously defined as a possible communication path, to ensure the communication between the gateway node 30a and the target node 30g.

Figure 3:
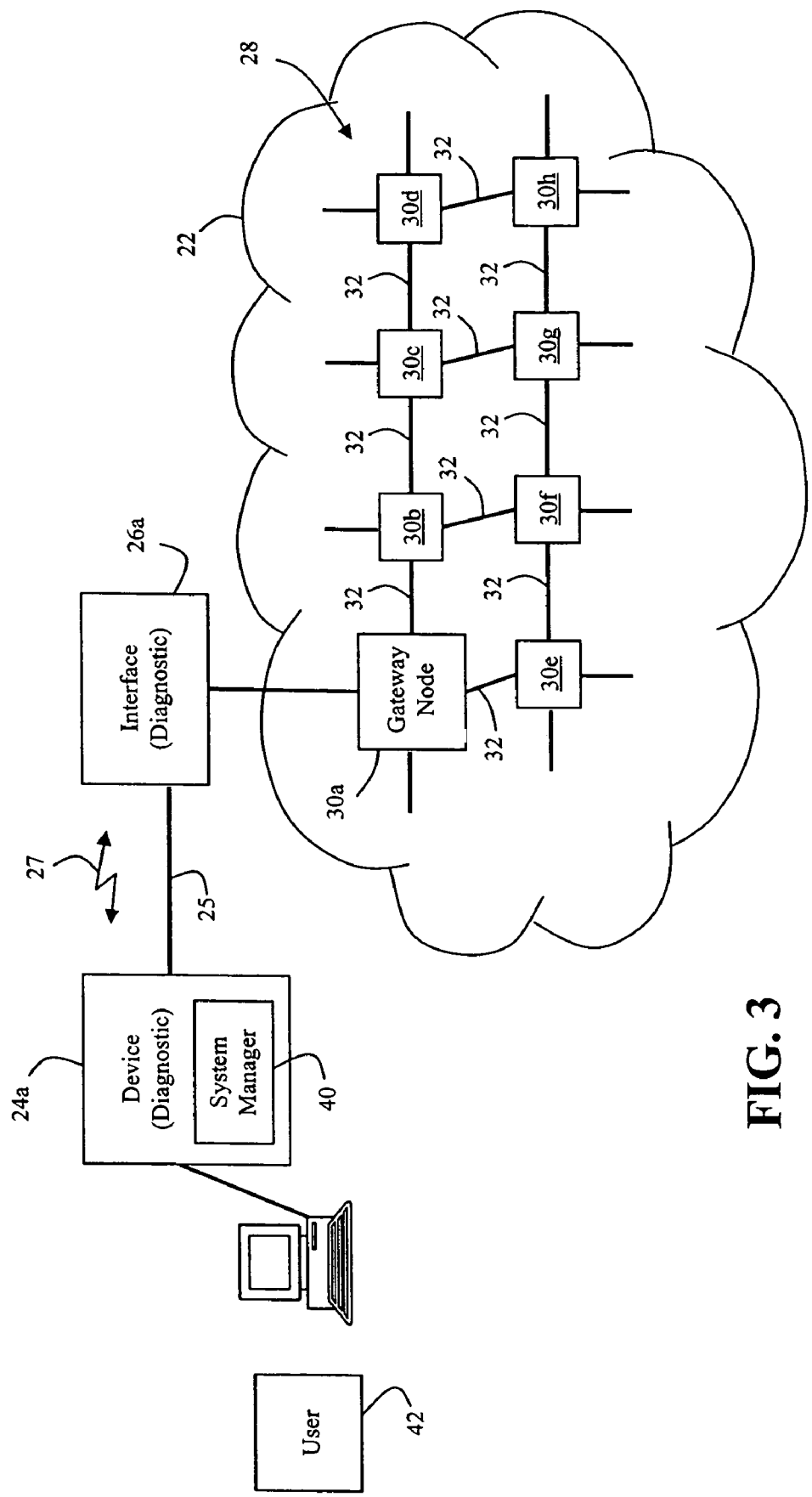
FIG. 3 is a diagram illustrating a portion of the switch fabric network connected to a diagnostic device and interface for the downloading of large records and files.

Some applications may require reprogramming of one or more nodes 30a-h in the switch fabric 28. The embodiment and topology shown in FIG. 3 advantageously permits the ability to upgrade or replace software and code in the switch fabric 28, including reprogramming software and code residing in the nodes 30a-h. FIG. 3 shows a user 42 that can interact with a diagnostic device 24a. The diagnostic device 24a contains a software manager 40 that includes instructions for initiating and controlling a reprogramming process of upgrading or replacing software and code in the switch fabric 28. The diagnostic device 24a is connected via a wired link 25 or a wireless link 27 to diagnostic interface 26a. The diagnostic interface 26a couples the diagnostic device 24a to the vehicle network 22 (and the switch fabric 28) through one of the nodes 30a-h, for example a gateway node 30a. In one embodiment, the diagnostic interface 26 is separate from the nodes 30a-h in the switch fabric network 28. However, in other embodiment, the diagnostic interface 26a and its functions may be incorporated into the gateway node 30a.

Figure 4:
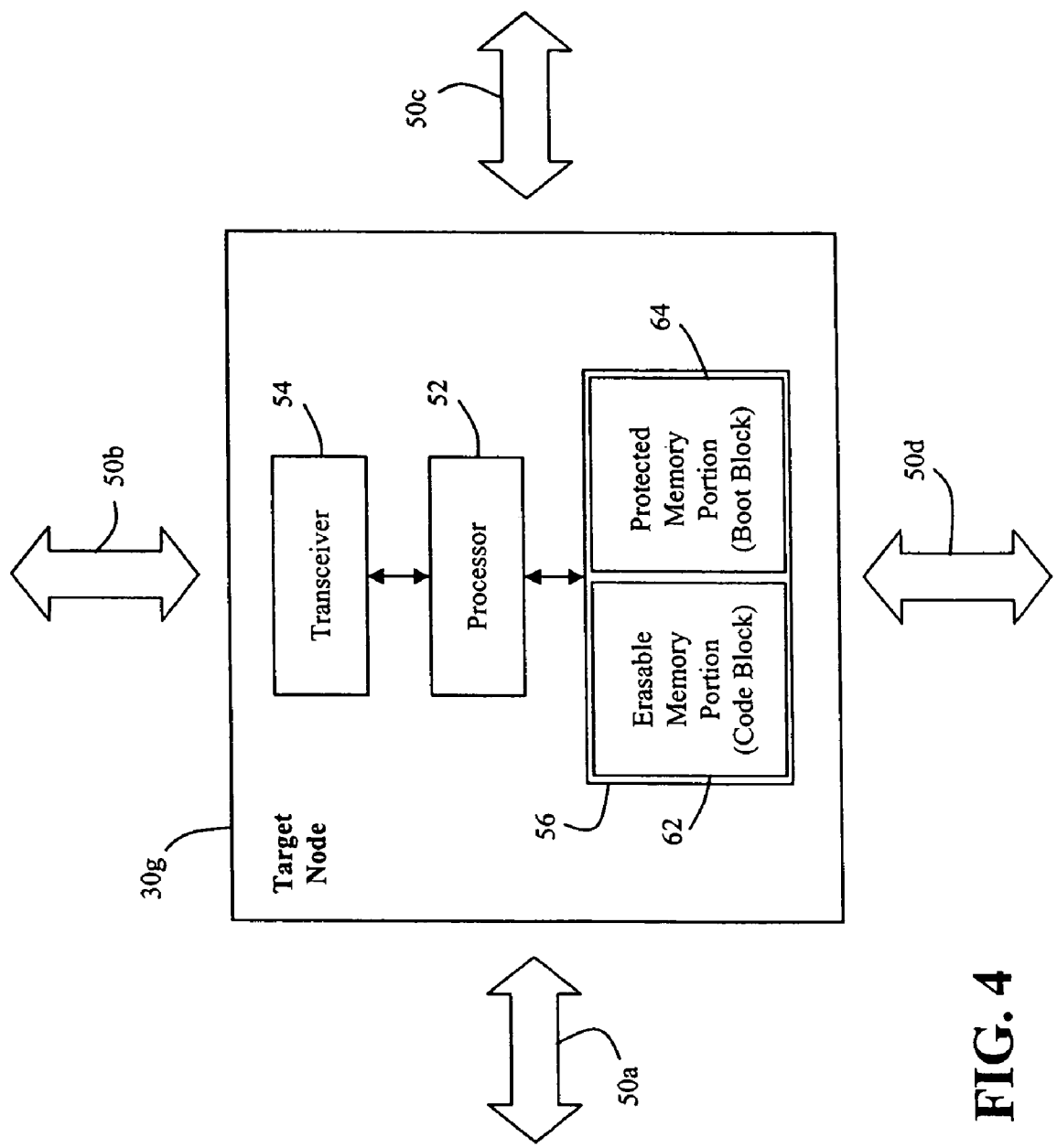
FIG. 4 is a diagram illustrating one embodiment of the components of a target node in the switch fabric network.

Each of the nodes 30a-h in the switch fabric 28 contain software components to enable data communications between the nodes 30a-h and devices 24a-d. A user 42 may use the diagnostic device 24a and the system manager 40 to send commands to upgrade or replace software and code in the switch fabric 28, including reprogramming software and code residing in the nodes 30a-h. For purposes of illustrating the present invention, assume that a user 42 desires to reprogram software components residing in a target node 30g. FIG. 4 shows one embodiment of a target node 30g that may be in need of new software components.

Figure 5:
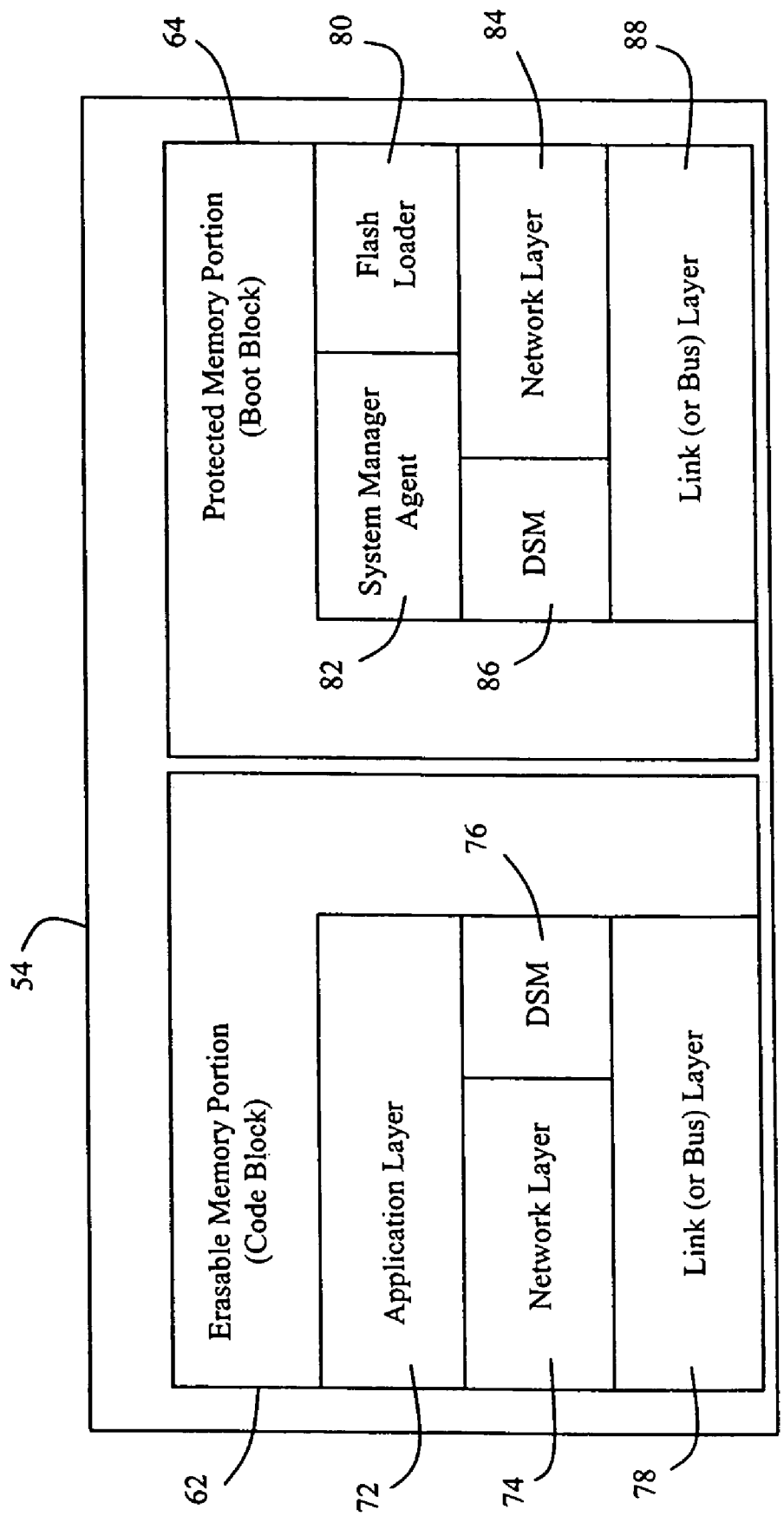
FIG. 5 is a diagram illustrating two memory portions of the target node in the switch fabric network for receiving large records and files.

To illustrate the functionality and the adaptability of the target node 30g, it is shown to include a plurality of input/output ports 50a-d although separate input and output ports could also be used. Various configurations of the target node 30g having more or fewer ports may be used in the network 22 depending on the application. The target node 30g includes a processor 52, at least one transceiver 54, and a memory 56. The memory 56 includes an erasable memory portion 62 and a protected memory portion 64. The processor 52 is configured to transfer control and execute instructions from software components residing in either the erasable memory portion 62 or the protected memory portion 64. The erasable memory portion 62 contains a set of software components (code block) to operate the target node 30g for normal data communications and operation within the switch fabric 28. In one embodiment, as shown in FIG. 5, the software components in the erasable memory portion 62 may include the complete software for an application layer 72, a network layer 74, and a link (or bus) layer 76. The erasable memory portion 62 may also include an embedded Distributed System Management (DSM) component 76 that can satisfy or act upon requests from the system manager 40. The DSM component 76 may be configured to work at one or more of the layers 72, 74, 78.

The protected memory portion 64 contains a set of software components (boot block) that includes functions to load software components safely and securely to the erasable memory portion 62. In one embodiment, as shown in FIG. 5, the software components residing on the protected memory portion 64 include a flash memory loader module 80, a system manager agent 82 (that can communicate with the system manager 40), and standard components for a network layer 84, a Distributed System Management (DSM) component 86, and a link (or bus) layer 88. The protected memory portion 64 cannot be erased by the user 42, the diagnostic device 24a, or the system manager 40. The protected memory portion 64 is also not accessible from the software components residing on the erasable memory portion 62.

Upon startup of the target node 30g, control should go directly to the software components residing on the protected memory portion 64, including the flash memory loader module 80 mentioned above. If the flash memory loader module 80 fails to initialize hardware in the target node 30g, the target node 30g may be configured to go to a low power standby. In one embodiment, the flash memory loader 80, upon node startup, will determine if valid software components reside (and is available) in the erasable memory portion 62. This will ensure that corrupted or partial software components in the erasable memory portion 62 does not deadlock the target node 30g. This determination may be done by checking a key number stored in a prescribed location in the erasable memory portion 62. If the key number is stored in the prescribed location, the processor 50 may be configured to switch control of the target node 30g from executing the software components residing on its protected memory portion 64 to the software components residing on its erasable memory portion 62.

If, however, the key number is not stored in the prescribed location, the flash memory loader 80 may assume that the software components in the erasable memory portion 62 is not valid and send a notification that the target node 30g needs to be reprogrammed. This notification may be sent to the gateway node 30a that will then forward the request to the system manager 40 residing on the diagnostic device 24a. The flash memory loader 80 should then remain in an idle state to await instructions from the system manager 40 to initiate reprogramming of the software components in the erasable memory portion 62, as will be explained in more detail below.

Additionally, the diagnostic system may be configured to allow the system manager 40 to query each node 30a-h in the switch fabric 28 to determine whether a node needs to be reprogrammed. In one embodiment, the system manager 40 may initiate a status dialogue with a target node 30g by sending a status request message to the gateway node 30a. The gateway node 30a will then route the status request message to the target node 30g. The target node 30g may then be configured to respond to the status request message by transmitting a status response message to the gateway node 30a, who may then forward the message back to the system manager 40. Depending on the content of the status response message, a user 42 may decide to reprogram a specific target node 30g.

Figure 6:
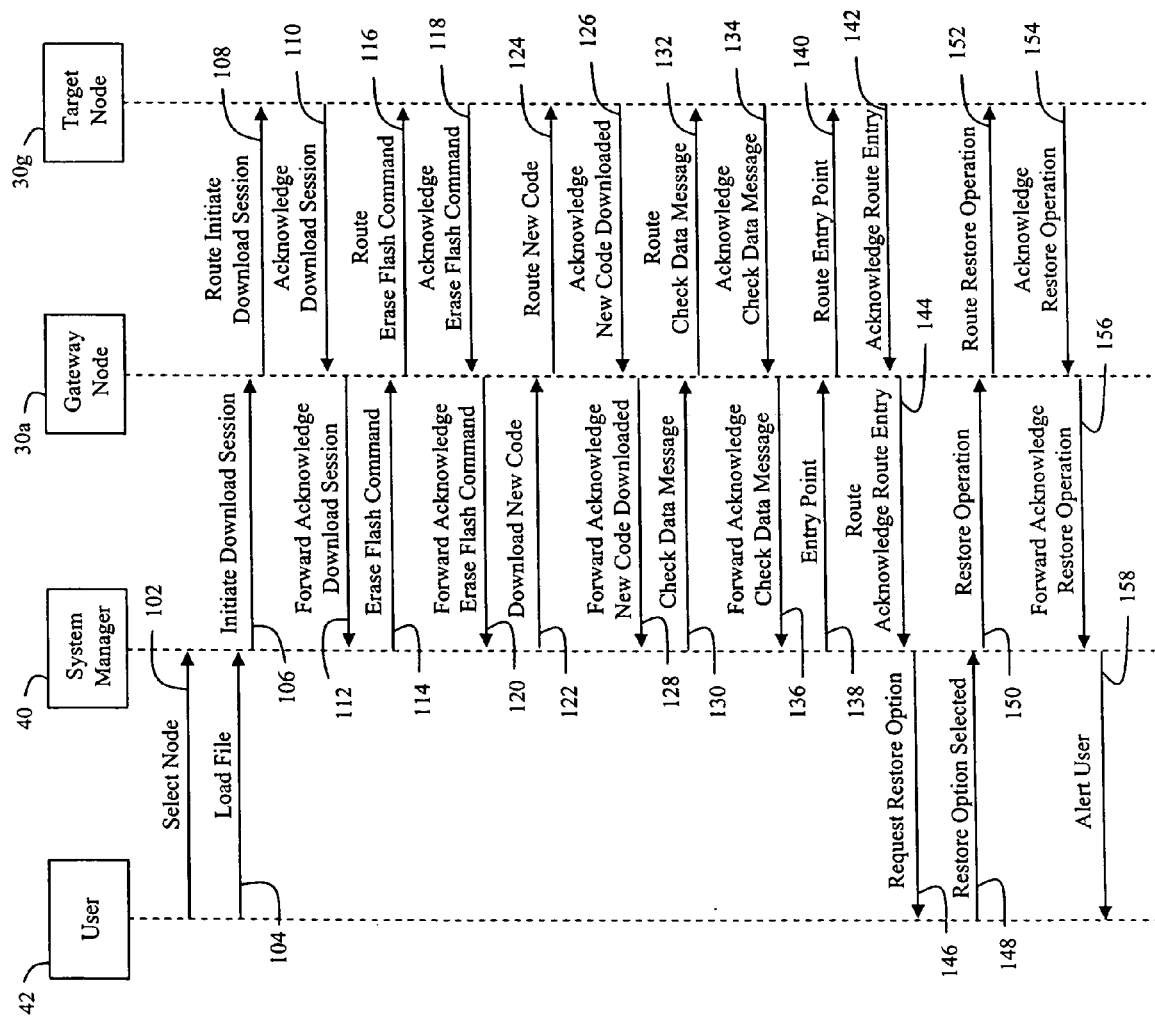
FIG. 6 is a message flow diagram illustrating one embodiment of the types of message that may be exchanged during the reprogramming of the target node.

FIG. 6 is a message flow diagram that illustrates one embodiment of a sequence of steps that a user 42 may take in reprogramming a target node 30g. The message flow diagram shows messages that may be exchanged between the user 42, the system manager 40 (residing on the diagnostic device 24a), the gateway node 30a, and the target node 30g. The user 42 may initiate the reprogramming operation using the system manager 42 by selecting the node identification of the target node 30g to be reprogrammed (arrow 102). The user 42 may then load a record file in the system manager 40 from a host's file system (arrow 104).

The system manager 40, residing on the diagnostic device 24a, will then initiate a download session with the target node 30g. In one embodiment, the system manager 40 may send an initiate download session message through the diagnostic interface 26a to the gateway node 30a (arrow 106). The gateway node 30a will then route the initiate download session message to the target node 30g (arrow 108).

In response to receiving an initiate download session message, the target node 30g, including processor 50, may be configured to switch from executing the software components residing on its erasable memory portion 62 to the software components residing on its protected memory portion 64. As mentioned above, it is preferred that software components in both the erasable memory portion 62 and the protected memory portion 64 include at least standard software components for the network layer 74, the Distributed System Management (DSM) component 76, and the link (or bus) layer 78. This will cause normal network functions to continue uninterrupted. However, any applications running on the target node 30g will not be available. After switching control from the software components residing on its erasable memory portion 62 to the software components residing on its protected memory portion 64, the target node 30g may then send an acknowledge download session message to the gateway node 30a (arrow 110), who will then forward the message to the system manager 40 (arrow 112).

After receiving the acknowledgement from the target node 30g, the system manager 40 will then send an erase flash command to the gateway node 30a for each block of memory that needs to be erased (arrow 114). The diagnostic device 24a may be configured to analyze the current software components and send one or more commands to erase some or all of the memory blocks in erasable memory portion 62. The gateway node 30a will route the erase flash command to the target node 30g (arrow 116). Upon receipt of the erase flash command, the target node 30g will erase the corresponding memory locations in the command. The target node 30g may then send an acknowledge erase flash command to the gateway node 30a (arrow 118), who will then forward the message to the system manager 40 (arrow 120).

The system manager 40 may then send a new set of compiled software components or records to the gateway node 30a (arrow 122). The software components or records are included in the build file loaded into the system manager 40 (arrow 104). The downloadable build file for reprogramming the target node 30g may contain thousands of records. Each record may be relatively large in size compared to the physical constraints of the data packets that can be transmitted over the communication links 32. In that case, the records should be broken down as described further below in relation to FIGS. 7-10. In any event, the gateway node 30*a* will route the new set of compiled software components or records to the target node 30*g* (arrow 124). The target node 30*g* may then send an acknowledgement to the gateway node 30*a* (arrow 126) when each component or record is received. The gateway node 30*a* will then forward the message to the system manager 40 (arrow 128). The system manager 40 may repeat the process of downloading software components or records until all necessary components or records are received by the target node 30*g*.

The system manager 40 may then send a check data message to the gateway node 30*a* (arrow 130). In one embodiment, the check data message includes a checksum for the new downloaded software components. The gateway node 30*a* will route the check data message to the target node 30*g* (arrow 132). The target node 30*g* will then calculate the checksum for the new set of software components into its erasable memory portion 62 and compare it against checksum received from the system manager 40. Assuming that the checksum matches, the target node 30*g* will then write the new set of software components into its erasable memory portion 62. The target node 30*g* may then send an acknowledge check data message to the gateway node 30*a* (arrow 134), who will then forward the message to the system manager 40 (arrow 136).

The system manager 40 may then send an entry point message to the gateway node 30*a* (arrow 138). In one embodiment, the entry point message includes an entry point for the code block. The gateway node 30*a* will route the entry point message to the target node 30*g* (arrow 140). In response, the target node 30*g* sends an acknowledge entry point message to the gateway node 30*a* (arrow 142), who will then forward the message to the system manager 40 (arrow 144).

Upon receiving the acknowledgement for the entry point message, the system manager 40 may then inform the user 42 about the successful completion of the download operation and provide the user 42 with an option to restore or reset the target node 30*g* (arrow 146). The user 42 may wish to postpone the restoration of the node until diagnosis of other nodes is complete. However, when the user 42 desires to restore the node, the user 42 may select a restore option to the system manager 40 (arrow 148). At this point, the system manager 40 may then send a restore operation message to the gateway node 30*a* (arrow 150). The gateway node 30*a* will then route the restore operation message to the target node 30*g* (arrow 152).

After receiving the restore operation message, the target node 30*g*, including processor 50, will then switch from executing the software components residing on its protected memory portion 64 to the software components residing on its erasable memory portion 62. This will allow normal operation of applications to run again on the target node 30*g*. The target node 30*g* may then send an acknowledge restore operation message to the gateway node 30*a* (arrow 154), who will then forward the message to the system manager 40 (arrow 156). The system manager 40 may then alert the user 42 that the acknowledgement was received from the target node 30*g* (arrow 158).

Figure 7:
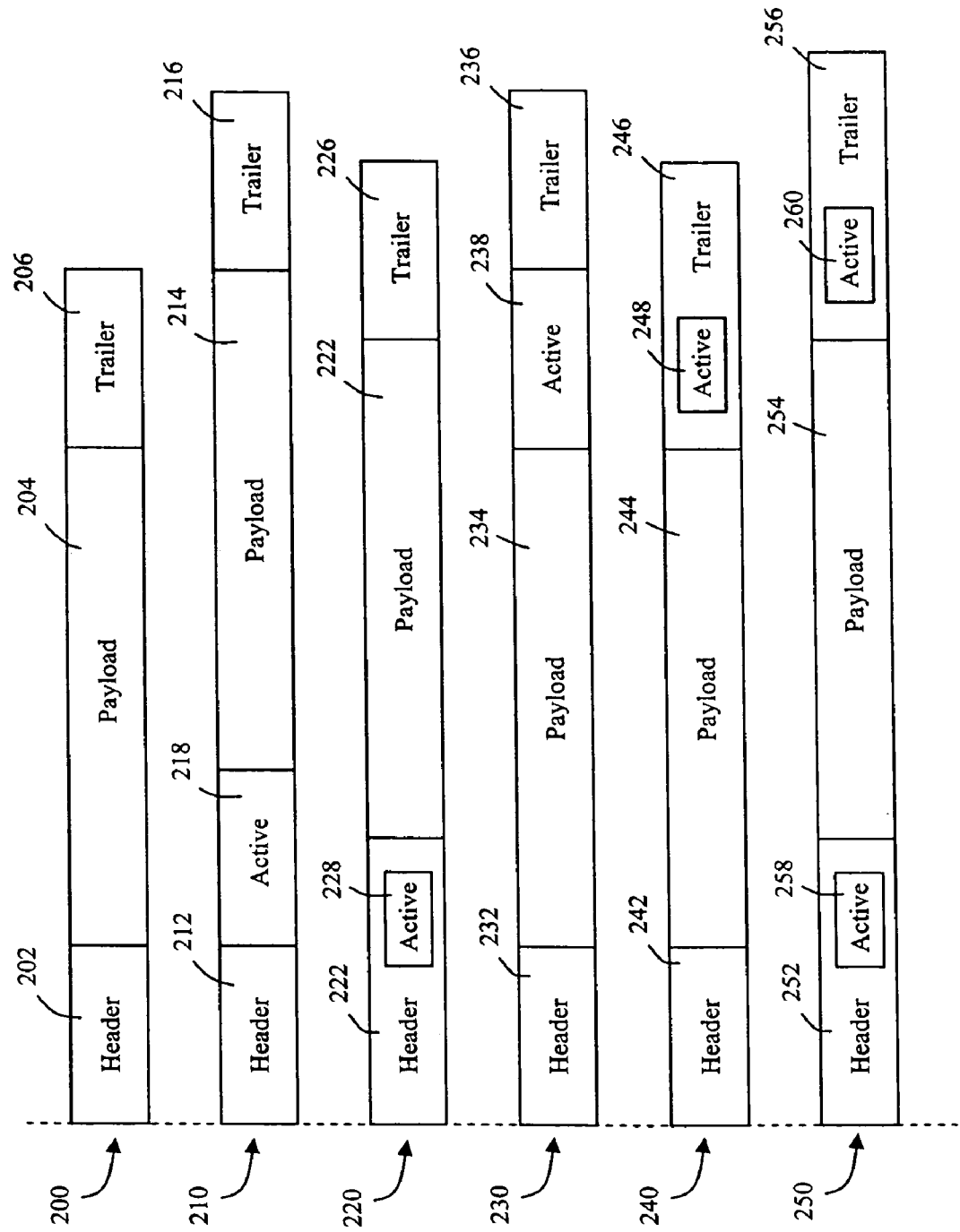
FIG. 7 illustrates various data packets that may be adapted for use in a vehicle switch fabric network.

FIG. 7 illustrates several data packet configurations that may be used in connection with switch fabric networks according to the embodiments of the present invention. As described, the network 22 may be configured to operate in accordance with TCP/IP, ATM, RapidIO, Infiniband and other suitable communication protocols. These data packets include structure to conform to the standard required. In one embodiment, a data packet for this invention may include a data packet 200 having a header portion 202, a payload portion 204, and a trailer portion 206. As described herein, the network 22 and the nodes 30*a-h* forming the switch fabric 28 may contain processing capability. In that regard, a data packet 210 includes along with a header portion 212, payload portion 214, and trailer portion 216 an active portion 218. The active portion 218 may cause the network element to take some specific action, for example providing alternative routing of the data packet, reconfiguration of the data packet, reconfiguration of the node, or other action, based upon the content of the active portion 218. The data packet 220 includes an active portion 228 integrated with the header portion 222 along with a payload portion 224 and a trailer portion 226. The data packet 230 includes a header portion 232, a payload portion 234 and a trailer portion 236. An active portion 238 is also provided, disposed between the payload portion 234 and the trailer portion 236. Alternatively, as shown by the data packet 240, an active portion 248 may be integrated with the trailer portion 246 along with a payload portion 244 and a header portion 242. The data packet 250 illustrates a first active portion 258 and a second active portion 260, wherein the first active portion 258 is integrated a header portion 252 and the second active portion 258 is integrated with the trailer portion 256. The data packet 250 also includes a payload portion 254. Other arrangements of the data packets for use with the present invention may be envisioned.

The active portion of the data packet may represent a packet state. For example, the active portion may reflect a priority of the data packet based on aging time. That is, a packet initially generated may have a normal state, but for various reasons, is not promptly delivered. As the packet ages as it is routed through the active network, the active portion can monitor time since the data packet was generated or time when the packet is required, and change the priority of the data packet accordingly. The packet state may also represent an error state, either of the data packet or of one or more nodes of the network 22. The active portion may also be used to messenger data unrelated to the payload within the network 22, track the communication path taken by the data packet through the network 22, provide configuration information (route, timing, etc.) to nodes 30*a-h* of the network 22, provide functional data to one or more devices 24*a-d* coupled to the network 22 or provide receipt acknowledgement.

The payload portion of the data packets carries data and other information relating to the message being transmitted through the network 22. The size of the data packet (including the payload portion) will be constrained by the physical layer on which the switch fabric 28 is built. There are situations where the message size at the application layer will be larger than the packet size allowed to be transmitted over the network 22. One situation, as described above, is where software components or records need to be downloaded to a node 30*a-h*. Accordingly, in one embodiment of the present invention, a message in the application layer that is larger than the packet size of the network 22 will be broken into smaller units to fit the packet size limitation. Each unit is placed into an individual data packet and transmitted independently over the switch fabric 28 to a destination node (such as the target node 30*g* receiving downloaded software components or records described above). At the destination node, the individual data packets are reassembled to its original form and passed to the application that receives and processes the message.

Figures 8, 9:
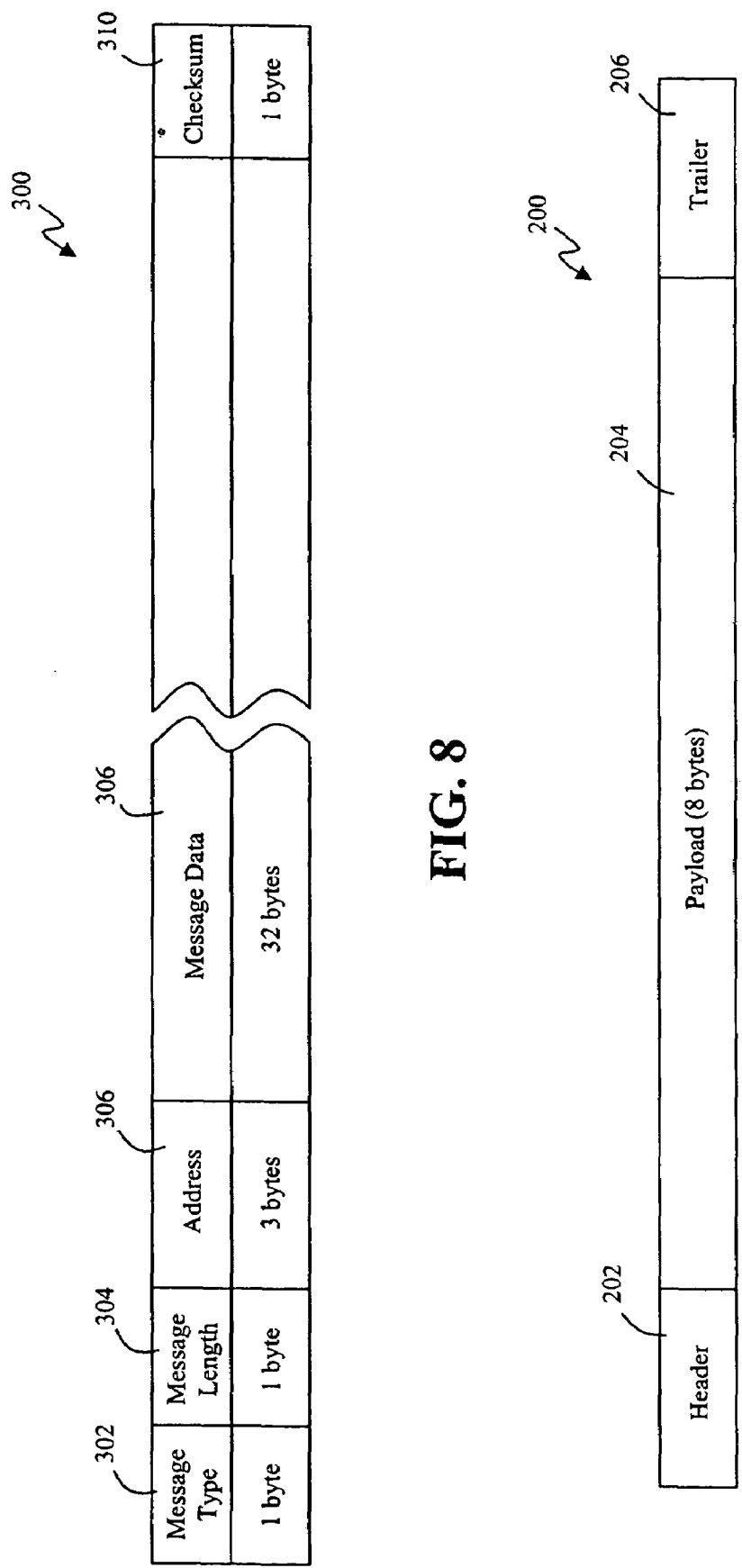
FIG. 8 illustrates a relatively large record or message that needs to be transmitted through the vehicle switch fabric network.
FIG. 9 illustrates a data packet having a small payload portion relative to the record or message of FIG. 8.

FIGS. 8 and 9 further illustrate one embodiment of dividing a large message down into individual units or data packets for transmission through the switch fabric 28. FIG. 8 illustrates a message 300 containing the a variety of fields including a message type field 302, a message length field 304, an address field 306, a message data field 308, and a checksum field 310. FIG. 9 illustrates a data packet 200 having a specific header portion 202, a payload portion 204, and a trailer portion 206.

Assume for purposes of illustration that the payload portion 204 of network data packets 200 is limited to 8 bytes. Also assume for purposes of illustration that the message 300 that needs to be transmitted through the switch fabric 28 is larger than the network limitation. For instance, the downloadable build file for reprogramming node software components may contain thousands of build records. In one embodiment, where the size of each build record is up to 38 bytes, one build file may include: the message type field 302 (1 byte); the message length field 304 (1 byte); the address field 306 (3 bytes); the message data field 306 (32 bytes); and the checksum field 310 (1 byte). In one embodiment of the present invention, the message 300 is divided into smaller data packets 200 where each data packet is assigned the same message identification but different sequence numbers. This is shown further in FIG. 10.

Figure 10:
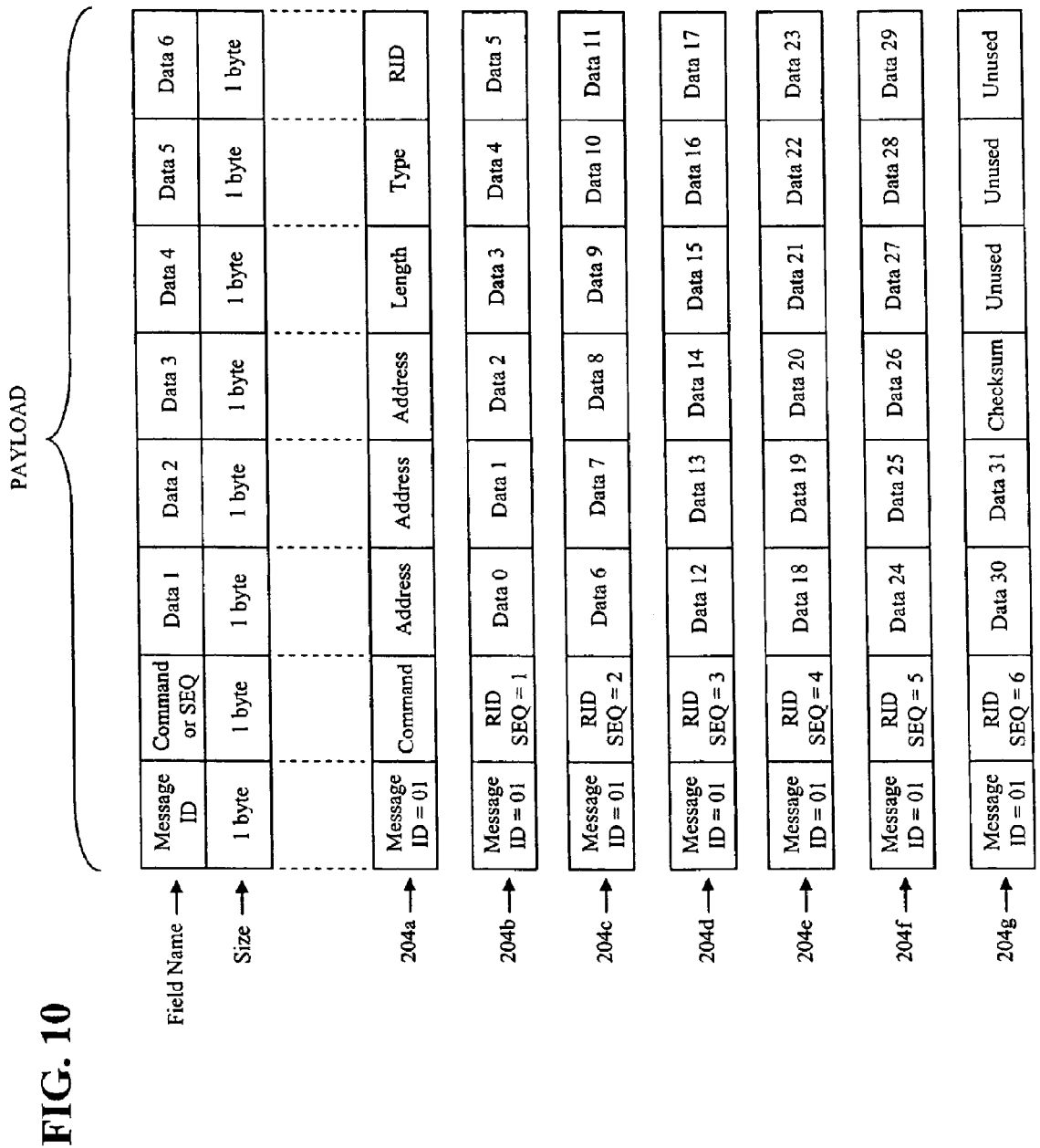
FIG. 10 illustrates a set of payload portions of data packets that carry information contained in the record or message of FIG. 8.

In FIG. 10, the message 300 may be divided into a plurality of data packets 200 (seven data packets in this example), each having different payload portions 204a-204g. The data packets may include an active portion (such as those shown in FIG. 7 as data packets 210, 220, 230, 240, 250) or no active portion (such as that shown in FIG. 7 as data packet 200). In either event, in one embodiment, where the payload portion 204 is constrained to 8 bytes, the payload portion 204a-204g may include eight fields that are each one byte long: a message identification field 322, a command or record identification (RID)/sequence field 324, and six data fields 326a-f. Each payload portion 204a-204g is carried over the switch fabric 28 by one switch fabric data packet 200.

The message identification field 322 for each of the payload portions 204a-g will contain a unique message identification assigned to the particular record or message 300 being transmitted. The message identification within the field 322 will be the same for all payload portions 204a-g that are common to the same record or message 300. In the reprogramming example described above, the message identification is used by the flash loader module 80 to track the received data packets so that it can associate different payload portions 204a-g with the same record or message 300.

The command or sequence field 324 contains either a command or a sequence number associated with the payload portion 204a-g. The command will indicate to the receiving node how to use the data carried by the following payload portions 204a-g. The command value should be different from the record identification (RID)/sequence value by design. Each payload portion 204a-g may have a record identification (RID)/sequence value except for the first payload portion 204a, which contains a command. In the reprogramming example described above, the record identification (RID)/sequence values may be used by the flash loader module 80 to group the received data packets so that it can re-assemble the record or message in the right order at the receiving node.

In one embodiment, the first payload portion 204a may include the values for the address field 306 (divided into 1 byte segments), the message length field 304 (1 byte), and the message type field (1 byte) of the original record or message 300. The first payload portion 204a may also include a record identification (RID) (1 byte). The remaining payload portions 204b-g may include the values found in the message data field 306 (divided into 32 byte segments) and the checksum field 310 of the original record or message 300. The value in the checksum 310 field may be used to protect against possible data corruption. After the original build record is reassembled at the receiving node, the build record's checksum is calculated. If the checksum does not match the received value, the whole record should be discarded and a negative response is sent.

What has been described is a system and method for streaming sequential data through a vehicle switch fabric network. This is particular useful in areas such as reprogramming nodes in the automotive switch fabric network where relatively large records or messages need to be transmitted through the switch fabric, although the invention may be used in other areas. In sum, the system and method described herein takes large data records and breaks them down into smaller units (data packets) that fit within the constraints of the physical layer on which communication links in the switch fabric network is built. The smaller data packets are assigned with a message identification and a sequence number. Data packets associated with the same data record or message are assigned with the same message identification but may differ in their sequence number. Each data packet is transmitted over the vehicle switch fabric network to a destination node. At the destination node, the data packets may be reassembled to its original data format based on the message identification and sequence numbers. The reassembled message may then be presented to an application in the node for processing. The above description of the present invention is intended to be exemplary only and is not intended to limit the scope of any patent issuing from this application. The present invention is intended to be limited only by the scope and spirit of the following claims.

What is claimed is:

1. A method for sending a record from an external diagnostic device through a switch fabric of a vehicle communication network, the switch fabric including a plurality of nodes joined by communication links for transmission of data packets therebetween, wherein the external diagnostic device is connected to the switch fabric of the vehicle communication network, and wherein the record comprises message data, the method comprising the steps of:

generating from the record, at the external diagnostic device, a first data packet comprising a first message identification, a first sequence number, and a plurality of first data elements, the plurality of first data elements containing at least a first portion of the message data in the record, wherein the message data in the record is larger than a packet size limitation of the switch fabric of the vehicle communication network, and wherein the first data packet containing the first portion of the message data in the record is within the packet size limitation of the switch fabric of the vehicle communication network;

generating from the record, at the external diagnostic device, a second data packet comprising a second message identification, a second sequence number, and a plurality of second data elements, the plurality of second data elements containing at least a second portion of the message data in the record, wherein the second data packet containing the second portion of message data in the record is within the packet size limitation of the switch fabric of the vehicle communication network;

transmitting the first data packet and the second data packet from the external diagnostic device to a target node in the switch fabric of the vehicle communication network; and receiving the first data packet and the second data packet at the target node and assembling at least the first portion of the message data and the second portion of the message data based on the first and second message identifications and the first and second sequence numbers.

2. The method in claim 1, wherein the message data includes software components for reprogramming a portion of memory in the target node.

3. The method in claim 1, wherein the first data packet comprises a header portion, a payload portion, and a trailer portion, the payload portion containing the first message identification, the first sequence number, and the plurality of first data elements.

4. The method in claim 1 further comprising the step of:
generating from the record, at the external diagnostic device, a third data packet comprising a third message identification, a third sequence number, and a plurality of third data elements, the plurality of third data elements containing at least a third portion of the message data in the record and a checksum for the message data, wherein the third data packet containing the third portion of message data in the record is within the packet size limitation of the switch fabric of the vehicle communication network, and
wherein the step of assembling includes assembling the first, second, and third portions of the message data based on the first, second, and third message identifications and on the first, second, and third sequence numbers.

5. The method in claim 1, wherein the target node comprises a memory having an erasable memory portion and a protected memory portion, the method further comprising the steps of:
erasing data in the erasable memory portion; and
storing at least the assembled first portion of the message data and the second portion of message data in the erasable memory portion.

6. A method for sending a record from an external diagnostic device through a switch fabric of a vehicle communication network, the switch fabric including a plurality of nodes joined by communication links for transmission of data packets therebetween, wherein the external diagnostic device is connected to the switch fabric of the vehicle communication network, and wherein the record comprises message data, the method comprising the steps of:
generating from the record, at the external diagnostic device, a first data packet comprising a message identification associated with the record, a command, and a message length;
generating from the record, at the external diagnostic device, a second data packet comprising the message identification associated with the record, a first sequence number, and a plurality of first data elements, the plurality of first data elements containing at least a first portion of the message data in the record, wherein the message data in the record is larger than a packet size limitation of the switch fabric of the vehicle communication network, and wherein the second data packet containing the first portion of message data in the record is within the packet size limitation of the switch fabric of the vehicle communication network;
generating from the record, at the external diagnostic device, a third data packet comprising the message identification associated with the record, a second sequence number, and a plurality of second data elements, the plurality of second data elements containing at least a second portion of the message data in the record, wherein the third data packet containing the second portion of message data in the record is within the packet size limitation of the switch fabric of the vehicle communication network;
transmitting the first, second, and third data packets from the external diagnostic device to a target node in the switch fabric of the vehicle communication network; and
receiving the first, second, and third data packets at the target node and assembling at least the first portion of the message data and the second portion of the message data based on the message identification associated with the record and the first and second sequence numbers.

7. The method in claim 6, wherein the message data includes software components for reprogramming a portion of memory in the target node.

8. The method in claim 6, wherein the second and third data packets each comprise a header portion, a payload portion, and a trailer portion, the payload portions containing the message identification associated with the record, the first and second sequence numbers, and the plurality of the first and second data elements.

9. The method in claim 6 further comprising the step of:
generating from the record, at the external diagnostic device, a fourth data packet comprising the message identification associated with the record, a third sequence number, and a plurality of third data elements, the plurality of third data elements containing at least a third portion of the message data in the record, wherein the fourth data packet containing the third portion of message data in the record is within the packet size limitation of the switch fabric of the vehicle communication network, and
wherein the step of assembling includes assembling the first, second, and third portions of the message data based on the message identification associated with the record and on the first, second, and third sequence numbers.

10. The method in claim 6, wherein the target node comprises a memory having an erasable memory portion and a protected memory portion, the method further comprising the steps of:
erasing data in the erasable memory portion; and
storing at least the assembled first portion of the message data and the second portion of message data in the erasable memory portion.

* * * * *

UNITED STATES PATENT AND TRADEMARK OFFICE
CERTIFICATE OF CORRECTION

| | |
|---|---|
| PATENT NO. | : 7,613,190 B2 |
| APPLICATION NO. | : 11/015153 |
| DATED | : November 3, 2009 |
| INVENTOR(S) | : Jordan et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this

Nineteenth Day of October, 2010

David J. Kappos
*Director of the United States Patent and Trademark Office*